US010102824B2

United States Patent
Khoury et al.

(10) Patent No.: US 10,102,824 B2
(45) Date of Patent: Oct. 16, 2018

(54) GESTURE FOR TASK TRANSFER

(71) Applicant: Microsoft Technology Licensing, LLC, Redmond, WA (US)

(72) Inventors: Issa Khoury, Seattle, WA (US); William Scott Stauber, Seattle, WA (US); Petteri Mikkola, Seattle, WA (US); Holger Kuehnle, Seattle, WA (US); Ryan Pendlay, Seattle, WA (US); Keri Moran, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 256 days.

(21) Appl. No.: 14/716,717

(22) Filed: May 19, 2015

(65) Prior Publication Data

US 2016/0343350 A1 Nov. 24, 2016

(51) Int. Cl.
| | |
|---|---|
| *G06F 3/0482* | (2013.01) |
| *G09G 5/12* | (2006.01) |
| *G06F 3/0481* | (2013.01) |
| *G06F 3/0484* | (2013.01) |
| *G06F 3/14* | (2006.01) |
| *G06F 3/0489* | (2013.01) |
| *G06F 3/0488* | (2013.01) |
| *G09G 5/14* | (2006.01) |

(52) U.S. Cl.
CPC ............ *G09G 5/12* (2013.01); *G06F 3/0482* (2013.01); *G06F 3/04817* (2013.01); *G06F 3/04842* (2013.01); *G06F 3/04845* (2013.01); *G06F 3/04883* (2013.01); *G06F 3/04892* (2013.01); *G06F 3/1423* (2013.01); *G06F 3/1454* (2013.01); *G09G 5/14* (2013.01); *G06F 2203/04803* (2013.01); *G09G 2370/12* (2013.01); *G09G 2370/16* (2013.01)

(58) Field of Classification Search
CPC ...................................... G06F 3/0482
USPC ...................................... 715/748
See application file for complete search history.

(56) References Cited

U.S. PATENT DOCUMENTS

| | | | | |
|---|---|---|---|---|
| 5,790,120 | A * | 8/1998 | Lozares | G06F 9/45512 715/779 |
| 6,340,957 | B1 * | 1/2002 | Adler | G06F 1/1615 345/1.3 |
| 6,779,023 | B2 | 8/2004 | Tognazzini | |
| 8,260,883 | B2 | 9/2012 | Mooring et al. | |

(Continued)

FOREIGN PATENT DOCUMENTS

WO 2005109829 A1 11/2005

OTHER PUBLICATIONS

"Project my phone screen to a TV or PC", Retrieved on: Feb. 9, 2015, Available at: http://www.windowsphone.com/en-us/how-to/wp8/connectivity/project-my-phone-screen.

*Primary Examiner* — Reza Nabi
*Assistant Examiner* — Daniel Rodriguez (57) ABSTRACT

A computing device, and method thereof, may have a first display. A first user input is received from an input device of the computing device. In response, a task manager is displayed, the task manager having representations of respective objects on the computing device. When a second user input is received via the input device, a target representation is selected according to the second user input and an application window of an application corresponding to the target representation is displayed on the second display.

19 Claims, 8 Drawing Sheets

(56) References Cited

U.S. PATENT DOCUMENTS

| | | | |
|---|---|---|---|
| 8,447,070 B1* | 5/2013 | Bozarth | H04N 7/18 382/103 |
| 8,478,816 B2 | 7/2013 | Parks et al. | |
| 8,631,328 B2* | 1/2014 | Kim | G06F 3/017 715/706 |
| 9,489,023 B1* | 11/2016 | Ispas | G06F 21/44 |
| 2005/0015731 A1* | 1/2005 | Mak | G06F 3/0481 715/779 |
| 2007/0146347 A1* | 6/2007 | Rosenberg | G06F 3/04883 345/173 |
| 2009/0113330 A1* | 4/2009 | Garrison | G06F 3/0486 715/769 |
| 2009/0140986 A1* | 6/2009 | Karkkainen | G06F 3/0486 345/173 |
| 2009/0237363 A1* | 9/2009 | Levy | G06F 3/0486 345/173 |
| 2010/0079355 A1* | 4/2010 | Kilpatrick, II | G06F 1/1616 345/1.3 |
| 2010/0149120 A1* | 6/2010 | Lee | H04N 5/4403 345/173 |
| 2010/0211698 A1* | 8/2010 | Krishnaswamy | H04W 4/003 710/11 |
| 2010/0293502 A1* | 11/2010 | Kang | G06F 1/1626 715/803 |
| 2010/0299436 A1* | 11/2010 | Khalid | G06F 1/1643 709/226 |
| 2010/0313143 A1* | 12/2010 | Jung | G06F 3/1446 715/753 |
| 2010/0315352 A1* | 12/2010 | Hamamura | G06F 3/0486 345/173 |
| 2011/0035448 A1* | 2/2011 | Leung | G06F 3/1423 709/205 |
| 2011/0074679 A1* | 3/2011 | West, Jr. | G06F 1/1626 345/163 |
| 2011/0163944 A1* | 7/2011 | Bilbrey | G01D 21/02 345/156 |
| 2011/0185390 A1* | 7/2011 | Faenger | G01C 21/3688 725/75 |
| 2011/0265022 A1* | 10/2011 | Kamiyama | G06F 3/0486 715/769 |
| 2011/0283334 A1* | 11/2011 | Choi | G06F 3/04883 725/148 |
| 2011/0319173 A1* | 12/2011 | Backer | A63F 13/31 463/42 |
| 2012/0001829 A1* | 1/2012 | Anttila | G06F 3/1431 345/1.1 |
| 2012/0005602 A1* | 1/2012 | Anttila | G06F 3/1431 715/761 |
| 2012/0110470 A1 | 5/2012 | Mistry et al. | |
| 2012/0117495 A1* | 5/2012 | Sirpal | G06F 1/1616 715/761 |
| 2012/0131458 A1 | 5/2012 | Hayes | |
| 2012/0226985 A1* | 9/2012 | Chervets | G06F 9/452 715/735 |
| 2012/0262458 A1* | 10/2012 | Fowler | G06T 19/00 345/427 |
| 2012/0272128 A1* | 10/2012 | Takaku | G06F 1/1624 715/205 |
| 2012/0296986 A1* | 11/2012 | Hassan | H04W 12/06 709/206 |
| 2012/0297229 A1* | 11/2012 | Desai | H04W 76/14 713/340 |
| 2012/0297306 A1* | 11/2012 | Hassan | H04W 76/023 715/735 |
| 2013/0007090 A1 | 1/2013 | Sankararaman | |
| 2013/0009987 A1* | 1/2013 | Takishita | G06F 1/1616 345/619 |
| 2013/0027315 A1* | 1/2013 | Teng | G06F 3/0488 345/173 |
| 2013/0041938 A1* | 2/2013 | Lin | G06F 3/0488 709/203 |
| 2013/0042202 A1* | 2/2013 | Mikami | H04M 1/67 715/781 |
| 2013/0046893 A1 | 2/2013 | Hauser et al. | |
| 2013/0069865 A1* | 3/2013 | Hart | H02G 11/00 345/156 |
| 2013/0074125 A1* | 3/2013 | Hao | H04W 4/14 725/40 |
| 2013/0080956 A1* | 3/2013 | Sirpal | G06F 3/1438 715/769 |
| 2013/0109371 A1* | 5/2013 | Brogan | G06F 1/1626 455/420 |
| 2013/0125016 A1* | 5/2013 | Pallakoff | G06F 3/04817 715/748 |
| 2013/0132885 A1* | 5/2013 | Maynard | G06F 3/04883 715/777 |
| 2013/0141331 A1* | 6/2013 | Shiu | G09G 5/003 345/158 |
| 2013/0201097 A1* | 8/2013 | Pasquero | G06F 3/0488 345/156 |
| 2013/0241801 A1* | 9/2013 | Petrik | G06F 3/1423 345/1.1 |
| 2013/0283193 A1* | 10/2013 | Griffin | G06F 3/1446 715/761 |
| 2013/0342579 A1* | 12/2013 | Yu | G09G 5/34 345/649 |
| 2014/0040834 A1* | 2/2014 | Thompson | G06F 3/0481 715/856 |
| 2014/0089821 A1* | 3/2014 | Rios, III | G06F 3/14 715/761 |
| 2014/0089823 A1* | 3/2014 | Kang | G06F 3/04847 715/761 |
| 2014/0115454 A1* | 4/2014 | Li | G06F 17/212 715/273 |
| 2014/0122644 A1* | 5/2014 | Kuscher | H04L 67/06 709/217 |
| 2014/0149881 A1* | 5/2014 | Cheng | H04W 4/21 715/748 |
| 2014/0164632 A1* | 6/2014 | Kim | H04L 67/34 709/227 |
| 2014/0184516 A1* | 7/2014 | Kim | G06F 3/0231 345/169 |
| 2014/0223490 A1* | 8/2014 | Pan | H04N 21/42224 725/61 |
| 2014/0229858 A1* | 8/2014 | Bleker | H04W 4/21 715/753 |
| 2014/0250475 A1 | 9/2014 | Goncalves et al. | |
| 2014/0267074 A1* | 9/2014 | Balci | G06F 9/451 345/173 |
| 2014/0282103 A1* | 9/2014 | Crandall | H04L 65/403 715/753 |
| 2014/0282728 A1* | 9/2014 | Matsunaga | G06F 3/0488 725/38 |
| 2014/0304612 A1* | 10/2014 | Collin | G06F 3/04842 715/748 |
| 2014/0331141 A1* | 11/2014 | Tijssen | G06F 3/0482 715/738 |
| 2014/0357192 A1* | 12/2014 | Azogui | H04B 7/26 455/41.2 |
| 2015/0026618 A1* | 1/2015 | Stone | G06F 3/0486 715/769 |
| 2015/0116391 A1* | 4/2015 | Murugesan | G09G 3/20 345/698 |
| 2015/0121238 A1* | 4/2015 | Lee | H04L 67/06 715/738 |
| 2015/0180543 A1* | 6/2015 | Verma | H04B 5/0031 455/41.1 |
| 2015/0199125 A1* | 7/2015 | Tsukamoto | G06F 3/04883 715/765 |
| 2015/0200985 A1* | 7/2015 | Feldman | H04L 67/36 715/753 |
| 2015/0208032 A1* | 7/2015 | Gavney, Jr. | H04N 5/232 348/14.08 |
| 2015/0220182 A1* | 8/2015 | Avrahami | G06F 3/03543 345/163 |
| 2015/0242101 A1* | 8/2015 | Ishino | G06K 9/00355 715/776 |

(56) References Cited

U.S. PATENT DOCUMENTS

| | | | |
|---|---|---|---|
| 2015/0248212 A1* | 9/2015 | Breedvelt-Schouten | G06F 3/04842 715/850 |
| 2015/0293739 A1* | 10/2015 | Choi | G06F 3/04812 345/157 |
| 2015/0309654 A1* | 10/2015 | Kitamura | G06F 3/0488 345/173 |
| 2015/0317120 A1* | 11/2015 | Kim | G06F 3/1438 345/1.3 |
| 2015/0378520 A1* | 12/2015 | Chandrasekaran | G06F 3/0482 715/716 |
| 2015/0379964 A1* | 12/2015 | Lee | G09G 5/12 345/173 |
| 2016/0048285 A1* | 2/2016 | Jwa | G06F 3/04842 715/769 |
| 2016/0050237 A1* | 2/2016 | Li | H04L 65/1069 709/231 |
| 2016/0183317 A1* | 6/2016 | Shao | H04W 76/023 709/227 |
| 2016/0210016 A1* | 7/2016 | Shin | G06F 3/0488 |
| 2016/0216862 A1* | 7/2016 | Turner | G06F 3/0488 |
| 2016/0301793 A1* | 10/2016 | Duan | G06F 13/10 |
| 2016/0313966 A1* | 10/2016 | Jeong | G04G 21/00 |
| 2016/0320937 A1* | 11/2016 | Zhou | G06F 3/0484 |
| 2017/0180915 A1* | 6/2017 | Adhikari | H04W 4/80 |
| 2017/0250830 A1* | 8/2017 | Chang | H04L 12/1407 |

* cited by examiner

GESTURE FOR TASK TRANSFER

BACKGROUND

With increasing processing power of mobile computing devices, in particular devices with cellular networking capabilities, many such devices now have the potential to drive both their own displays as well as one or more external displays. While more powerful computing devices such as desktop computers have long been capable of rendering graphics for multiple displays, because such devices are typically stationary, the mechanisms provided to manage multiple displays have tended to be cumbersome and static. Users have had to manually connect to additional displays, configure how the operating system manages the displays, and sometimes take extra steps to make use of multiple displays. Moreover, wireless displays have recently become inexpensive and easy to use. While a mobile device might frequently come within range of such displays, it has yet to be appreciated that there is a lack of ways for a user to efficiently direct graphic output rendered by a mobile device to a secondary display, perhaps while the device's built-in display maintains its ordinary functionality.

SUMMARY

The following summary is included only to introduce some concepts discussed in the Detailed Description below. This summary is not comprehensive and is not intended to delineate the scope of the claimed subject matter, which is set forth by the claims presented at the end.

A computing device, and method thereof, may have a first display. A first user input is received from an input device of the computing device. In response, a task manager is displayed, the task manager having representations of respective objects on the computing device. When a second user input is received via the input device, a target representation is selected according to the second user input and an application window of an application corresponding to the target representation is displayed on the second display.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
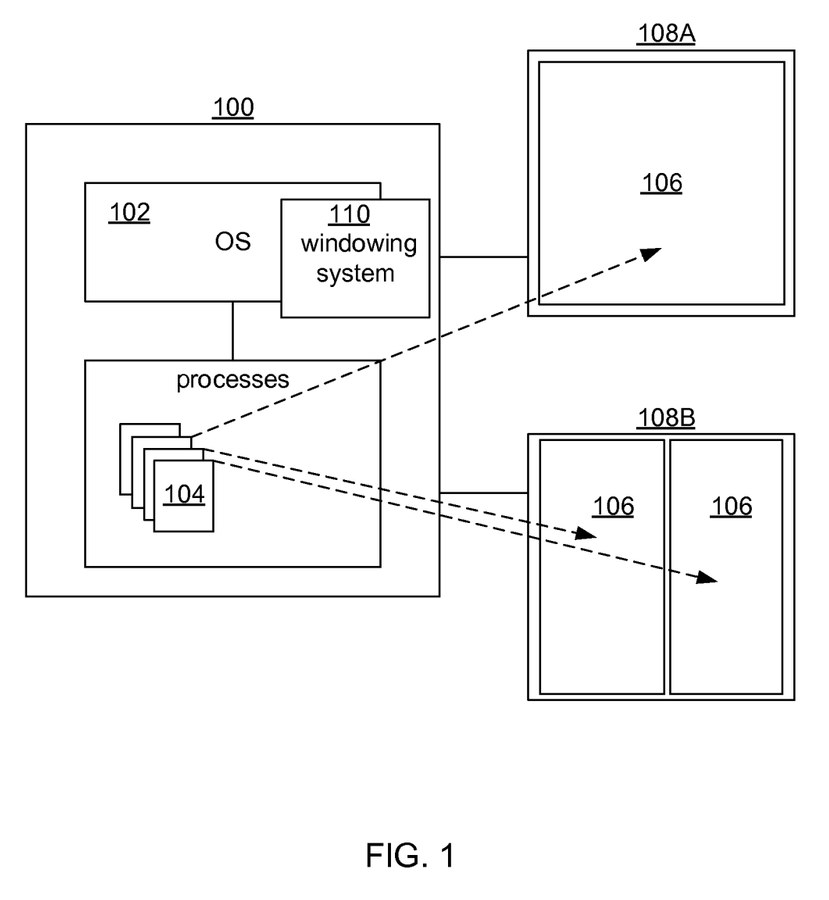
FIG. 1 shows a computing device having an operating system managing application processes and displaying corresponding windows.

FIG. 1 shows a computing device 100 having an operating system 102 managing application processes 104 and displaying corresponding windows 106 on a first display 108A and a second display 108B, which may be connected to a port or wireless interface of the computing device 100 (as used herein, "first display" and "second display" refer to any arbitrary displays and do not imply an order). For discussion, reference numeral "108" will indicate a display that may be either of the displays. In addition, all discussion herein of two displays is readily extendable to three or more displays; any description involving two displays implicitly applies to possible additional displays. In an embodiment, the first display 108A is incorporated into the body of the computing device 100, and also includes a touch-sensitive surface.

The computing device 100 may be any of a variety of types which are described later with reference to FIG. 8. The computing device 100 may be assumed to have at least storage and a processor for, respectively, storing and executing the operating system 102 and the application processes 104. Although there may be windowing systems with individual windows that represent multiple processes, and also processes without windows, for ease of discussion application processes 104 are assumed herein to each have at least a corresponding window 106 (also to be referred to as application windows). Processes 104 are well known operating system objects that are discretely managed units of execution, typically having a process identifier, memory at least partially managed by the operating system (heap and/or stack memory), and may be managed using a process table of process identifiers that is maintained by the operating system 102.

A windowing system 110 may be partly integrated with or closely coupled with the operating system 102. For purposes herein, distinctions between these components are not significant; an operating system itself may be considered to be a windowing system. The windowing system 110 may have functionality that is known in the computing arts, such as handling of input events (e.g., touches/strokes, clicks, keypresses, mouse drags, etc.) inputted by a user with various types of input devices. The windowing system 110 also manages the application windows 106 by handling related events or user interactions such as closing windows, moving windows, resizing windows, directing input to windows, rendering multiple concurrent windows, and others. The windowing system 110 may also provide a background and system controls (user interface elements) not specific to an application, which will be addressed further below. For some computing devices, there may be no clear distinction between a windowing system and operating system; for purposes herein, unless context dictates otherwise, the terms "windowing system" and "operating system" may be used interchangeably.

Figure 2:
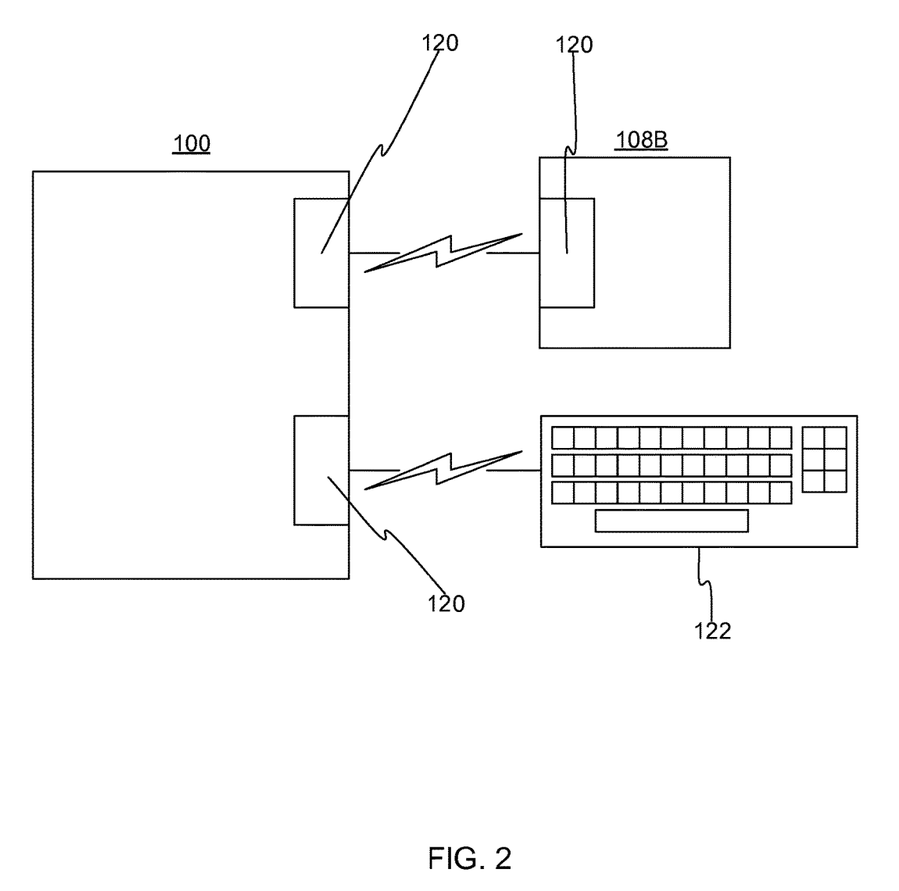
FIG. 2 shows an embodiment where the computing device communicates using wireless interfaces with one or more other devices.

FIG. 2 shows an embodiment where the computing device 100 communicates using wireless interfaces 120 with one or more other devices. In this embodiment, communication with the second display 108B may be established with a wireless connection based on any number of known standards, for example, Wireless Display (WiDi,™), WirelessHD™, Wireless Personal Area Network/BlueTooth™, Wireless Home Digital Interface (WHDI), AirPlay™, Wireless HDMI (High-Definition Media Interface), or others. Other devices such as a keyboard 122 may also be connected to the computing device 100. Different types of wireless connections may be used for different devices. For example, the second display 108B might be connected using WiDi interfaces, and the keyboard 122 might be connected using BlueTooth interfaces. In any case, wireless interfaces 120 have provide respective radios with range at least sufficient for communicating within a same room, for example. Some types of wireless interfaces can allow for passive discovery, for example, using beacons. For example, BlueTooth Low-Energy (LE) interfaces may allow the computing device 100 to discover the presence of wireless devices such as the second display 108B or the keyboard 122.

Figure 3:
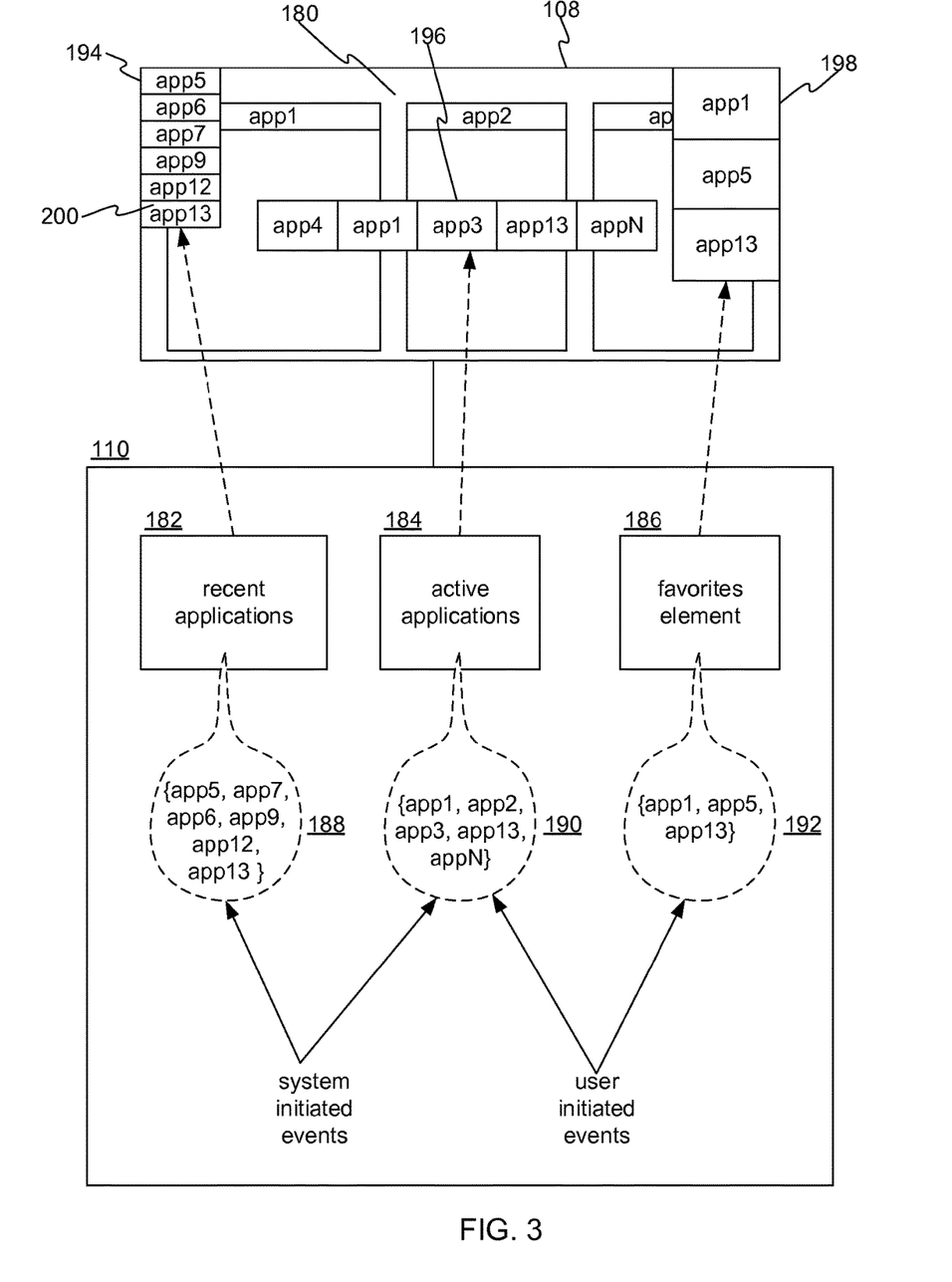
FIG. 3 shows a graphical user interface provided by or implemented on top of the windowing system.

FIG. 3 shows a graphical user interface 180 provided by or implemented on top of the windowing system 110. The elements and features of the graphical user interface 180 are only examples and other types of features are contemplated and equally applicable to application windows and application groups (for example, a search feature might return both applications and application group objects). In addition, at times some or all of the user interface elements of the graphical user interface 180 may or may not be displayed or are only displayed when requested per input from a user.

The windowing system 110 may have various features or facilities that allow a user to manage and invoke applications (or objects associated with applications) on the computing device 100. Such features, which are sometimes referred to herein as "user interface elements", or "system elements", might include a recent-applications module 182, an active-applications module 184, and/or a favorites module 186. Any such discrete user interface element with its own types of inputs and respective functions will sometimes be referred to as a "task manager" or a "task switcher", although tasks per se may not be involved. That is, in one embodiment a task manager might have representations of objects such as files, media objects, personal contacts, phone call records, slide decks, word processing documents, or other objects that are not themselves applications but which may be associated with and used by applications. A task manager may include graphic representations of only objects, only applications, or may include representations of both. Represented objects or applications may or may not be currently open when their representation is displayed.

The modules shown in FIG. 3 cooperate with the windowing system 110 (or are a part thereof) to track the semantically relevant information. When applications are opened or used the windowing system might populate a recent-applications list 188 with indicia of recently used applications. The windowing system might similarly populate or provide an active-applications list 190, which might include applications currently displayed on any connected monitors and/or applications that are executing or suspended but are not currently displayed. Similarly, a user might maintain a favorite-applications list 192.

These lists are used by corresponding user interface elements 194, 196, 198 (examples of task managers) that can be invoked and used by the user to direct operations to applications or objects. In some embodiments, the user interface elements 194, 196, 198 may be persistently displayed, and in other embodiments they are displayed only when activated by a user input such as after pressing and releasing a hardware or software button, or while a hot key is depressed, or after inputting a touch gesture, etc. Some of the user interface elements 194, 196, 198 may be undisplayed when they are used to open an application, or when display-sustaining input ends, or when a user invokes a close command. In one embodiment, the same user interface element can be used to display different sets of applications or objects. For example, the user interface element 196 might have the same inputs and actions for scrolling, selecting items, closing, etc., and yet can be used to display different sets of applications or objects.

The system user interface elements 194, 196, 198 in FIG. 3 are only examples. Other bases for providing lists of applications or objects may be used. For example, an "all applications" user interface element may be provided to show user-activatable graphic representations of all applications installed on the computing device (or all applications represented in a graphical user shell). In another embodiment, a collection of applications/objects may be determined dynamically based on user-defined selection criteria such as a query string, category flags, tags, etc. Any of the above-discussed types of user interface elements may also be implemented as full-screen elements and may, for example, be managed by the windowing system as special types of application windows. In other embodiments, the user interface elements provided by the user interface 180 might overlay underlying windows, whose appearance might change when the user interface elements are displayed.

Figure 4:
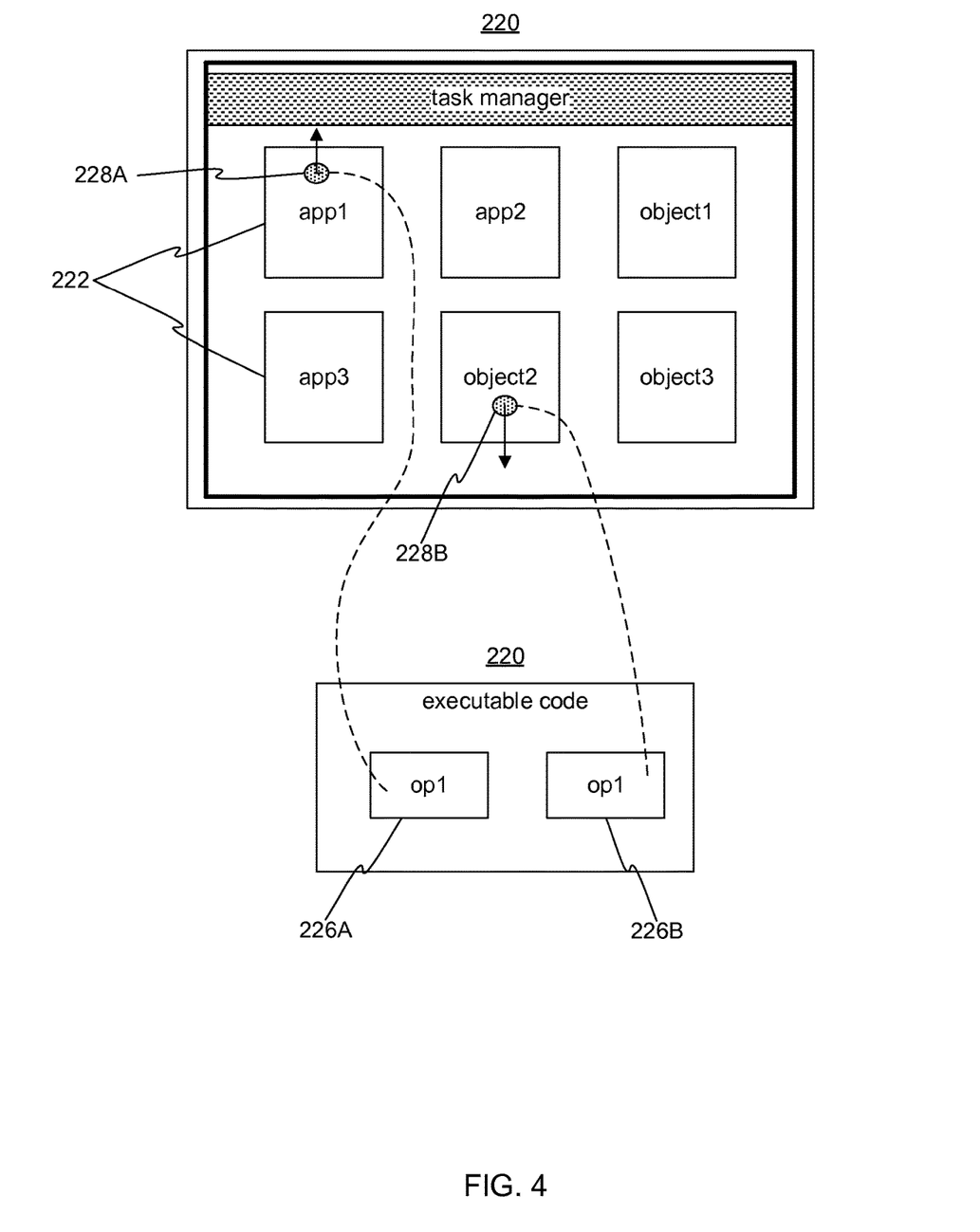
FIG. 4 shows an example of a task manager.

FIG. 4 shows an example of a task manager 220. The task manager 220, as noted above, is a discrete user interface element that allows a user to interactively control or select functions for arbitrary represented applications and/or objects. As discussed above, the items represented by icons or graphic representations 222 in the task manager 220 may be manually and/or systematically selected and arranged. The representations 222 represent corresponding applications or objects. For convenience herein, where "applications" are mentioned, objects may be equally applicable, depending on the context.

The task manager 220 may be configured to have exclusive input focus such that while the task manager is displayed user inputs are handled by the task manager 220. Or, the task manager 220 may be configured such that inputs directed to a display area of the task manager 220 (e.g., where its image and/or its representations 222 are displayed) might be handled by the task manager. In either case, if the task manager 220 is activated/displayed by a user input, subsequent stroke inputs (e.g., touch-based inputs) or indicia of corresponding interpreted gestures are passed to the task manager by the windowing system 110. Moreover, different types of strokes or gestures may invoke different functions of the task manager 220.

The executable code 224 of the task manager 220 may include several or more functions or operations 226A, 226B, which map to corresponding input types 228A, 228B. The operations 226A, 226B can be any operations. In one embodiment, the operations 226A, 226B (more than two are possible) might include one or more task management operations, such as opening an application (perhaps starting execution thereof if necessary), closing an application (undisplaying a corresponding window and/or stopping execution of the application), restarting an application, etc. In one embodiment, the task manager 220 may have only one operation, which would be the transfer operation described below.

The input types 228A, 228B can be any types of input, for instance, strokes or gestures, keystrokes, physical movements detected by motion sensors in the computing device 100, etc. In one embodiment, the input types are swipes in different directions such as up and down (relative to the task manager 220). Instances of the input types invoke respective operations of the task manager 220. Generally, the application corresponding to a representation targeted by a user input will be targeted by the operation corresponding to the input. In one embodiment, downward swipe inputs trigger a close-application operation on respective applications, upward swipe inputs trigger a transfer operation on respective applications (as will be described below) and taps inputs open the target application or object on the display displaying the task manager 220.

Figure 5:
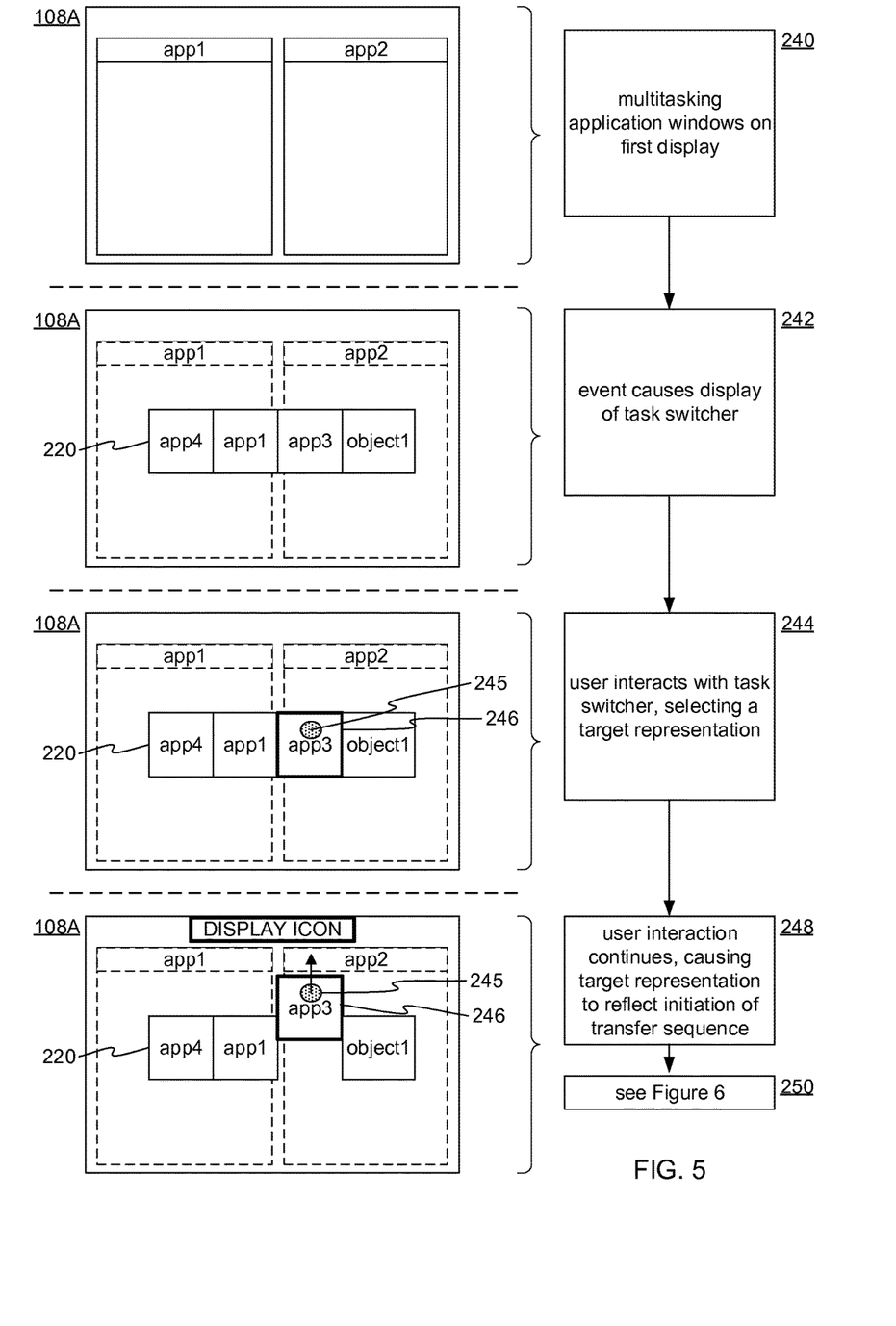
FIG. 5 shows a sequence of a transfer operation performed with the task manager.

FIG. 5 shows a sequence of a transfer operation performed with the task manager 220. Starting from the top of FIG. 5, at step 240 the graphical user interface 180 is active on the first display 108A. At step 242 an event causes the display of the task switcher 220. The event can be a system generated event or a user input such as a tap, a key or press, a virtual keyboard command, a voice command (if voice recognition inputting is supported), etc. At this state, the task switcher 220 is active and ready to handle instances of its input types and invoke respective operations or functions. The task switcher 220 can be deactivated responsive a designated input type, in response to an input outside a display area of the task manager 220, or perhaps responsive to an input outside a display area associated with the task manager 220.

At step 244, the user interacts with the task manager 220. As noted above, the types of inputs able to be handled by the task manager 220 can vary for different implementations, and occurrences of different input types may invoke different operations such as task management operations. In the example of FIG. 5, the input type is an upward swipe 245 that starts on a representation 246 of application 3. The upward swipe 245 input "contacts" or otherwise associates with the target representation 246, which selects the representation 246.

At step 248 the upward swipe 245 continues. In one embodiment, movement of the target representation 246 can be linked to the upward swipe 245, and as the swipe continues upward, the target representation 246 also moves upward. In one embodiment, the target representation 246 initially moves upward "on rails" (constrained to vertical movement) in correspondence with the upward swipe 245. In another embodiment the target representation 246 moves freely, possibly after moving on rails a certain distance. A threshold condition can be provided that is tested as the upward swipe 245 progresses, and if the threshold condition is satisfied, the transfer operation, which corresponds to the upward swipe 245, is invoked. The threshold condition might be a minimum distance or duration of the upward swipe 245, the upward swipe 245 reaching a predefined region such as a display edge or a task-transfer region, or the upward swipe 245 staying in a defined region for sufficient time.

Figure 6:
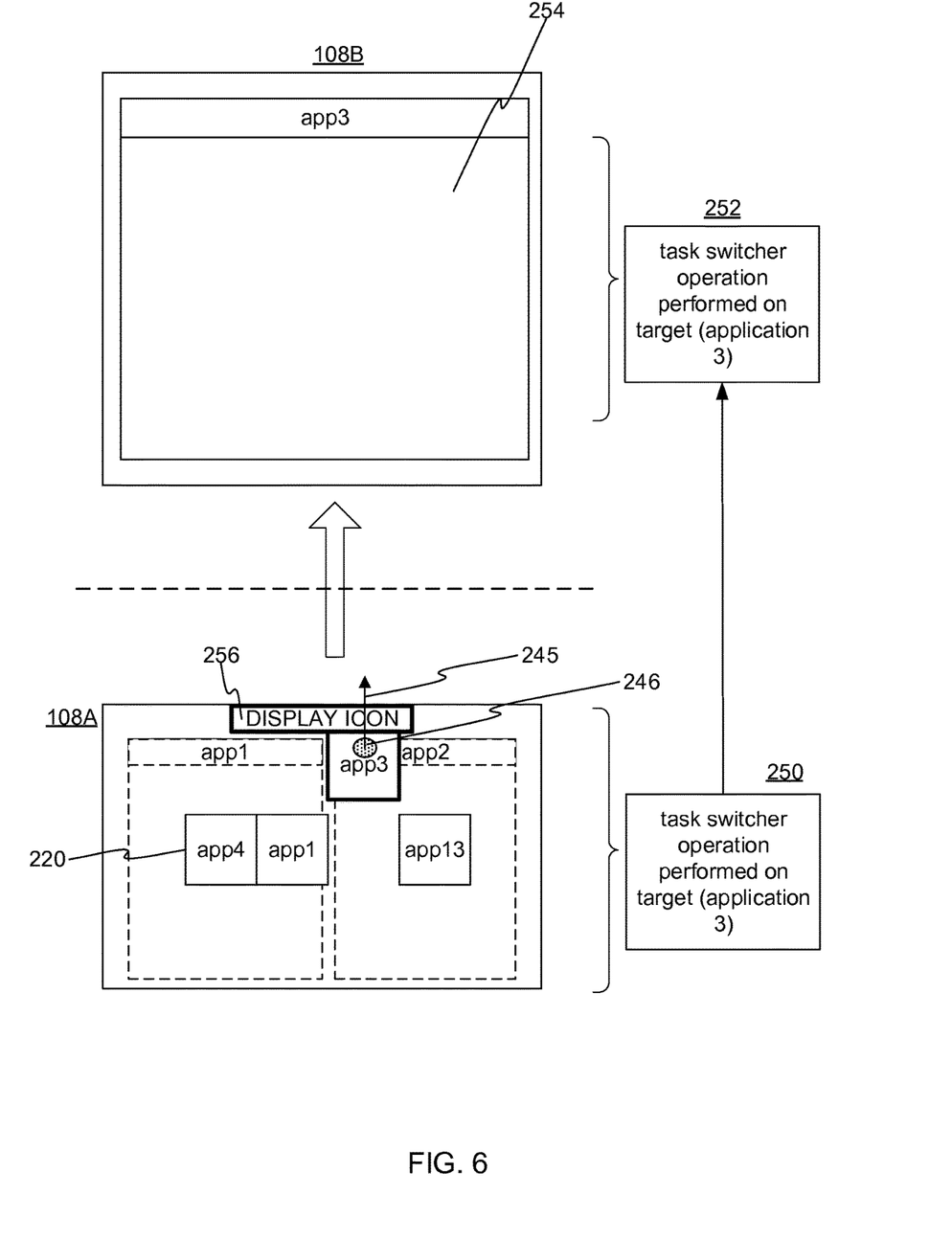
FIG. 6 shows completion of the transfer operation invoked in FIG. 5.

FIG. 6 shows completion of the transfer operation invoked in FIG. 5. Assuming that the upward swipe 245 successfully invokes the corresponding transfer operation of the task manager 220, then the transfer operation is performed at step 252. This can involve several steps. First, the task switcher checks to see if there is a connection to a second display, such as display 108B. If there is a connection, then using an application programming interface (API) of the windowing system, an application window 254 is displayed on the second display 108B. If there is no connection to a second display, then notably, as part of the transfer operation and in partial response to the upward swipe input, the operating system is instructed to scan for available secondary displays. This might involve communicating with the device driver of a display adapter, instructing one or more wireless interfaces (e.g., a WiDi interface) to scan for available displays and perhaps connect to the first found or nearest display, etc. Assuming that a second display is detected, a connection is automatically formed, the second display is turned on if needed (per a signal from the computing device to the second display) and the windowing system begins managing display of any windows or user interface elements that become associated the second display.

In one embodiment, as part of handling the upward swipe 245, the task manager 220 determines whether a corresponding application is already executing on the computing device 100. If not, then the application may be started. In either case, an application window corresponding to the target representation 246 is displayed on the second display 108B. For example, if the target representation 246 is a document, a corresponding word processor is started if necessary and the document is shown in a window thereof on the second display 108B. If the target representation 246 is an icon representing an application, the application begins (if not already) or resumes execution on the computing device 100 and a window provided by the application is automatically directed to the second display 108B by the task manager 220 in cooperation with the windowing system.

To summarize, with one input a user can open a task manager or similar user interface element. With another input, the user can both select an object or application in the task manager and initiate displaying a window corresponding to the selected object or application on a second display, even if there is not currently a connection to a second display. If a flick or swipe gesture is implemented as the type of input that invokes the transfer operation, then the appearance can be given of the user flicking the object or application from the first display to the second display, since the target representation is displayed as moving "off" of the first display and then the corresponding target object or application is displayed on the second display.

As noted above, other types of user interface elements may be used. For instance, a user shell or file browser may implement similar functionality. Preferably, the input types for the operations such as the transfer operation are handled by a discrete system-provided user interface element that handles the necessary input types.

In the case where multiple secondary displays are connected to the computing device or available to be connected to, the user input invoking the task transfer operation can also be used to select which display will be targeted. For example, a display icon 256 can be displayed for each display, and the task manager can be scrolled horizontally to align a particular representation with a particular display icon. When the particular representation is aligned with the particular display icon and the representation is "flicked" toward the particular display icon, the corresponding secondary display is selected, connected to if necessary, and used by the windowing system of the computing device 100 to display the corresponding object or application. In another embodiment, the representation is dragged to the icon of the desired display to select that display.

Other approaches can be used to select from among multiple displays. If, among available displays, the computing device has a record of connecting with one of them, then that display can be automatically selected. Another approach is for the computing device to automatically select which display is closest, perhaps according to signal strength if polling for wireless displays. Yet another approach is to use sensors of the computing device to identify a display closest to a pointing direction of the computing device, which is then selected.

As mentioned above, it is also possible that the computing device has other external devices to which it can connect, in particular, human interface devices (HID) such as a keyboard, a mouse, a microphone, etc. Not only can a user input actuate a connection to a secondary or external display or monitor, one or more HIDs can also be sensed for and automatically attached. For example if a wireless keyboard is also detected, then the computing device can also automatically connect to the wireless keyboard. Thus, if a work area has a wireless display and a wireless keyboard (and/or a mouse), the user of the client device can "flick" an application and the application, though running on the computing device, is displayed on the secondary display, and at the same time becomes controllable by the user through the keyboard/mouse. In a sense, the computing device cooperating with the wireless peripheral devices in the work area can together give the user the experience of working on a desktop computer. If a secondary wireless display and HID devices are already coupled to another computing device such as a workstation, the computing device can nevertheless supersede the other computing device. In another embodiment, the computing device can select which display to display a graphic based on which input device is in use or was last used by the user. For example, if the user taps a touch sensitive surface of the computing display, the computing device's display is used to display a resulting graphic (e.g., a user interface element). If the user interacts with an external input device such as a wireless mouse, then the external display is selected to display the resulting graphic (e.g., a task manager).

Figure 7:
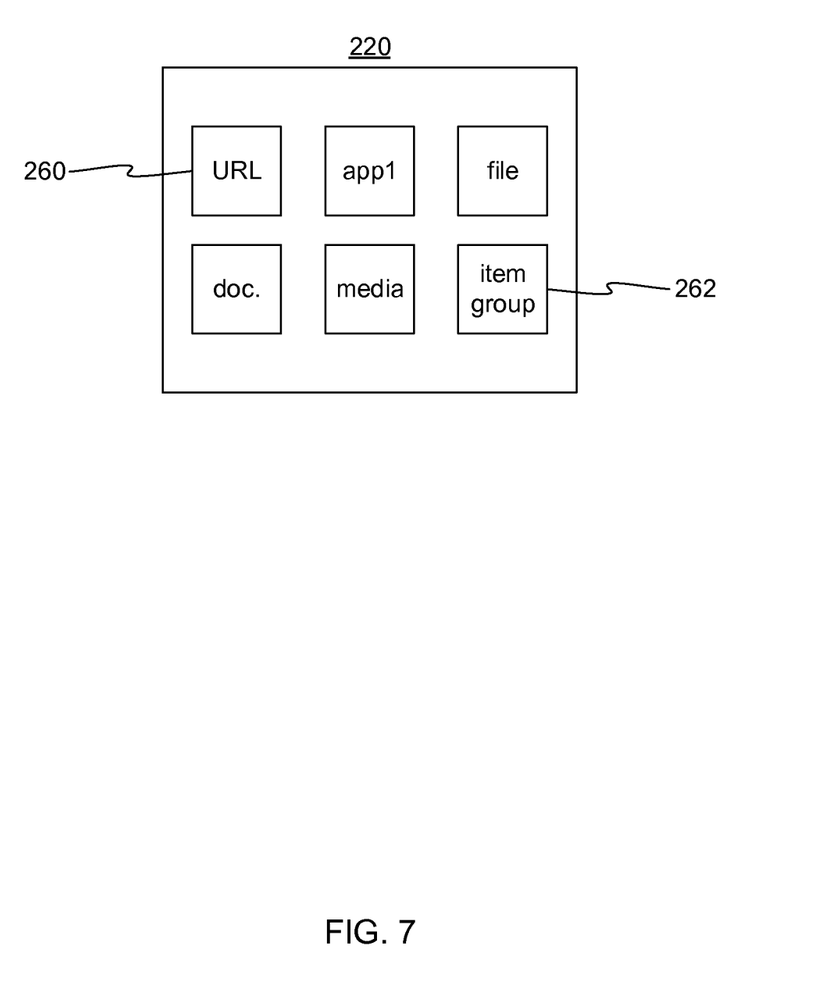
FIG. 7 shows an example of the task manager with a variety of selectable items.

FIG. 7 shows an example of the task manager 220 with a variety of selectable items 260. As noted above, the types of items representable in the task manager 220 is not limited. Examples include an application icon that represents an icon, data objects such as data files, documents, Uniform Resource Locators (URLs), media files, and others. An object or item can also be a group of items. Group representation 262 is an example of a graphic representation corresponding to a group of items. The group can be formed in numerous ways; manually, by capturing indicia of the items last displayed on the last secondary display to which the computing device was connected, by a dynamic search specifying membership properties, etc.

As used herein, the term "launch" refers to both initially opening an application (e.g., starting a new process) as well as well as opening (displaying) the already-running (possibly dormant) application window for an application.

Figure 8:
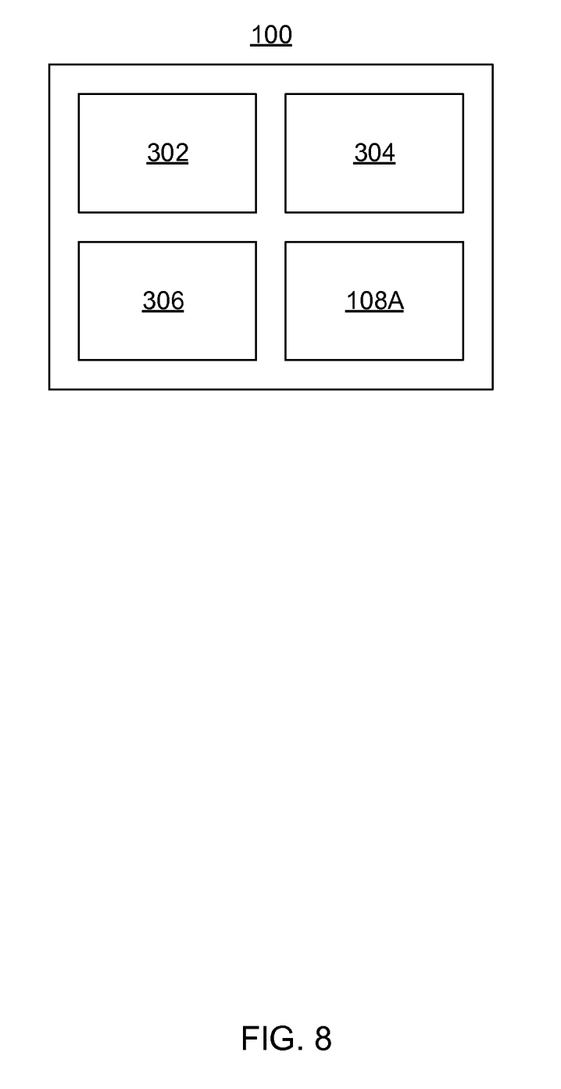
FIG. 8 shows a generic example of a computing device.

FIG. 8 shows a generic example of the computing device 100. The computing device 100 comprises storage hardware 302, processing hardware 304, networking hardware 306, which might include wireless media interfaces, cellular networking hardware, and possibly the first display 108A. The processing hardware 304 can be a general purpose processor, a graphics processor, and or other types of processors. The storage hardware can be one or more of a variety of forms, such as optical storage (e.g., compact-disk read-only memory (CD-ROM)), magnetic media, flash read-only memory (ROM), volatile memory, non-volatile memory, or other hardware that stores digital information in a way that is readily consumable by the processing hardware 304.

The embodiments described above can be implemented by information in the storage hardware 302, the information in the form of machine executable instructions (e.g., compiled executable binary code), source code, bytecode, or any other information that can be used to enable or configure the processing hardware to perform the various embodiments described above. The details provided above will suffice to enable practitioners of the invention to write source code corresponding to the embodiments, which can be compiled and executed.

The invention claimed is:

1. A method performed by a computing device comprising a first display, the method comprising:
   maintaining a task list of applications available for execution on the computing device;
   receiving a first user input, and in response displaying a user interface element comprising a graphic representation of the task list, the graphic representation comprising representations of respective graphic objects respectively representing the applications in the task list;
   receiving a second user input associated with the user interface element, and in response:
      selecting, according to the second user input, a target representation from among the representations, the target representation representing an open application according to the task list;
      scanning to detect displays, the scanning detecting a second display;
      selecting the second display from among a plurality of wireless displays, wherein when the second user input is inputted and received there is no connection between computing device and the second display; and
      automatically forming a connection between the computing device and the second display, and displaying, by the second display, an application window of the application corresponding to the target representation.

2. A method according to claim 1, further comprising displaying, by the first display, the target representation moving from the user interface element to a graphic representing the second display.

3. A method according to claim 1, wherein the first and second user inputs are inputted with a first input device of the computing device, and wherein in further response to the second user input, connecting the computing device to a second input device associated with the second display, and enabling the application window to be controlled on the second display according to user input, from the second input device, that is directed to the application window in the second display.

4. A method according to claim 1, wherein the application window comprises a graphic of an object provided by the application processing an object corresponding to the target representation.

5. A method according to claim 1, further comprising identifying the second display and a third display and accordingly, in further response to the second input, displaying display representations of the respective second and third displays, wherein the second display is selected for connecting-to based on the second user input selecting the display representation corresponding to the second display.

6. A method according to claim 1, further comprising displaying a cursor on the second display and allowing control of the cursor with a wireless keyboard connected to the computing device, the computing device comprising a mobile telephone, wherein the first display of the mobile telephone displays graphics of telephone functions executing on the mobile telephone while the application is being displayed on the second display.

7. A computing device comprising:
a first display;
an input device usable by a user to provide two-dimensional inputs;
storage hardware storing an operating system, applications installed to the operating system, and instructions;
processing hardware, when operating, to execute the instructions to perform a process comprising:
responsive to a user interaction with the computing device, displaying on the first display a user interface element comprising representations corresponding to applications, the user interface element able to handle input instances of a first input type, the input instances corresponding to uses of the input device, the handling comprising invoking a transfer operation, and
detecting an input instance of the first type of user input determined to be associated with a target one of the representations of the user interface element, the input instance detected while there is no connection between the computing device and a second display, and responsive to the input instance, automatically:
scanning for wireless displays to detect the second display, wirelessly signaling the second display to turn on based on the detection of the second display by the scanning, establishing a corresponding wireless connection between the computing device and the second display, and then displaying an application window of the target application on the second display, wherein there is no connection with the second display prior to the user interaction, and wherein the signaling the second display to turn on and the establishing the corresponding wireless connection are performed automatically without requiring user input.

8. A computing device according to claim 7, wherein the user interface element comprises a task manager and is able to handle input instances of a second input type by invoking a second operation comprising a task management operation, wherein input types comprises respective swipe gestures.

9. A computing device according to claim 8, wherein the swipe gestures comprise respective different directions relative to the first display.

10. A computing device according to claim 8, wherein the task management operation comprises an application closing operation or an application opening operation.

11. A computing device according to claim 7, wherein the connection comprises a wireless connection.

12. A computing device according to claim 7, wherein the input device comprises a touch-sensitive surface.

13. A method comprising:
executing, by a computing device comprising a first display, a windowing system that manages windows of respective applications on the computing device, the windowing system configured to manage displaying of windows on multiple displays;
responding to a first user interaction with the computing device by displaying, on the first display, a user interface element comprising a set of icons of respective applications, the user interface element enabling a user to select any of the icons in the set of icons, the user interface element comprising a task-switcher that identifies open applications on the computing device and based thereon represents the open applications as the respective icons in the set of icons; and
while no connection is established between the computing device and a second display, receiving and responding to a second user interaction with the user interface element that selects a first icon by first wirelessly scanning for displays, the scanning detecting a second display, based on the detection of the second display, forming a connection between the computing device and the second display, and by displaying, on a second display, an application window of a first application that corresponds to the selected icon, the selected first icon representing an application that is open when the first icon is selected, the second user interaction occurring while there is no connection between the computing device and the second display, wherein the second user interaction triggers both the scanning, the forming the connection, and the displaying the first application on the second display.

14. A method according to claim 13, further comprising responding to a third user interaction with the task switcher that selects a second icon by performing an application management function on a second application that corresponds to the second icon.

15. A method according to claim 14, wherein the application management function comprises either an application-close function that closes the second application or an application-open function that displays a window of the second application on the first display.

16. A method according to claim 13, further comprising, in further response to the second user interaction, determining that a connection with the second display is required, and in response automatically forming a connection between the computing device and the second display.

17. A method according to claim 13, wherein the second user interaction comprises a stroke that both selects and drags the first icon.

18. A method according to claim 17, further comprising initially moving the first icon on rails according to the stroke until determined that the first icon has moved a threshold distance, then moving the first icon automatically, and then displaying the application window of the first application on the second display.

19. A method according to claim 13, wherein the computing device comprises a first input device and wherein a second input device is connected to the computing device, the method further comprising selecting either the first or second display to which to display a graphic, wherein the selecting is based on which of the input devices is currently in use or was most recently used.

* * * * *